(12) United States Patent
Saito

(10) Patent No.: US 10,720,657 B2
(45) Date of Patent: Jul. 21, 2020

(54) FUEL CELL SYSTEM AND CONTROL METHOD THEREFOR

(71) Applicant: TOYOTA JIDOSHA KABUSHIKI KAISHA, Toyota-shi, Aichi-ken (JP)

(72) Inventor: Hiromu Saito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 272 days.

(21) Appl. No.: 15/856,151

(22) Filed: Dec. 28, 2017

(65) Prior Publication Data

US 2018/0269504 A1 Sep. 20, 2018

(30) Foreign Application Priority Data

Mar. 15, 2017 (JP) ................. 2017-049591

(51) Int. Cl.
*H01M 8/0438* (2016.01)
*H01M 8/04089* (2016.01)
*H01M 8/04082* (2016.01)
*H01M 8/04746* (2016.01)
*H01M 8/04664* (2016.01)
*H01M 8/04955* (2016.01)

(52) U.S. Cl.
CPC ... *H01M 8/04432* (2013.01); *H01M 8/04089* (2013.01); *H01M 8/04104* (2013.01); *H01M 8/04201* (2013.01); *H01M 8/04388* (2013.01); *H01M 8/04686* (2013.01); *H01M 8/04753* (2013.01); *H01M 8/04955* (2013.01); *H01M 2250/20* (2013.01); *Y02T 10/7005* (2013.01); *Y02T 90/32* (2013.01)

(58) Field of Classification Search
CPC .......... H01M 8/0428; H01M 8/04432; H01M 8/04082; H01M 8/04104; H01M 8/04089; H01M 8/04201; H01M 8/04753; H01M 8/04686; H01M 8/04388; H01M 8/04231; H01M 8/04097; H01M 8/04955; H01M 8/0494

See application file for complete search history.

(56) References Cited

FOREIGN PATENT DOCUMENTS

| JP | 2008-71734 | 3/2008 | |
|---|---|---|---|
| JP | 2010-3527 | 1/2010 | |
| JP | 2010-21127 | 1/2010 | |
| JP | 2010003527 A | * 1/2010 | ........... G01N 21/774 |

* cited by examiner

*Primary Examiner* — Karie O'Neill Apicella
(74) *Attorney, Agent, or Firm* — Finnegan, Henderson, Farabow, Garrett & Dunner, LLP

(57) ABSTRACT

A fuel cell system includes: a pressure regulating valve that reduces a pressure of a fuel gas; a fuel gas supply passage having a first passage extending between a fuel cell and the pressure regulating valve and a second passage extending from the pressure regulating valve via a cutoff valve to a fuel gas supply source; a pressure sensor that detects a pressure of the fuel gas inside the first passage; and a controller to which the cutoff valve and the pressure sensor are connected. When a pressure value detected by the pressure sensor is an abnormal value, the controller closes the cutoff valve and performs pressure reduction processing for the first passage. Thereafter, the controller judges that the pressure regulating valve has failed when the pressure value detected by the pressure sensor has lowered, whereas the controller judges that the pressure sensor has failed when the pressure value detected by the pressure sensor has not lowered.

12 Claims, 2 Drawing Sheets

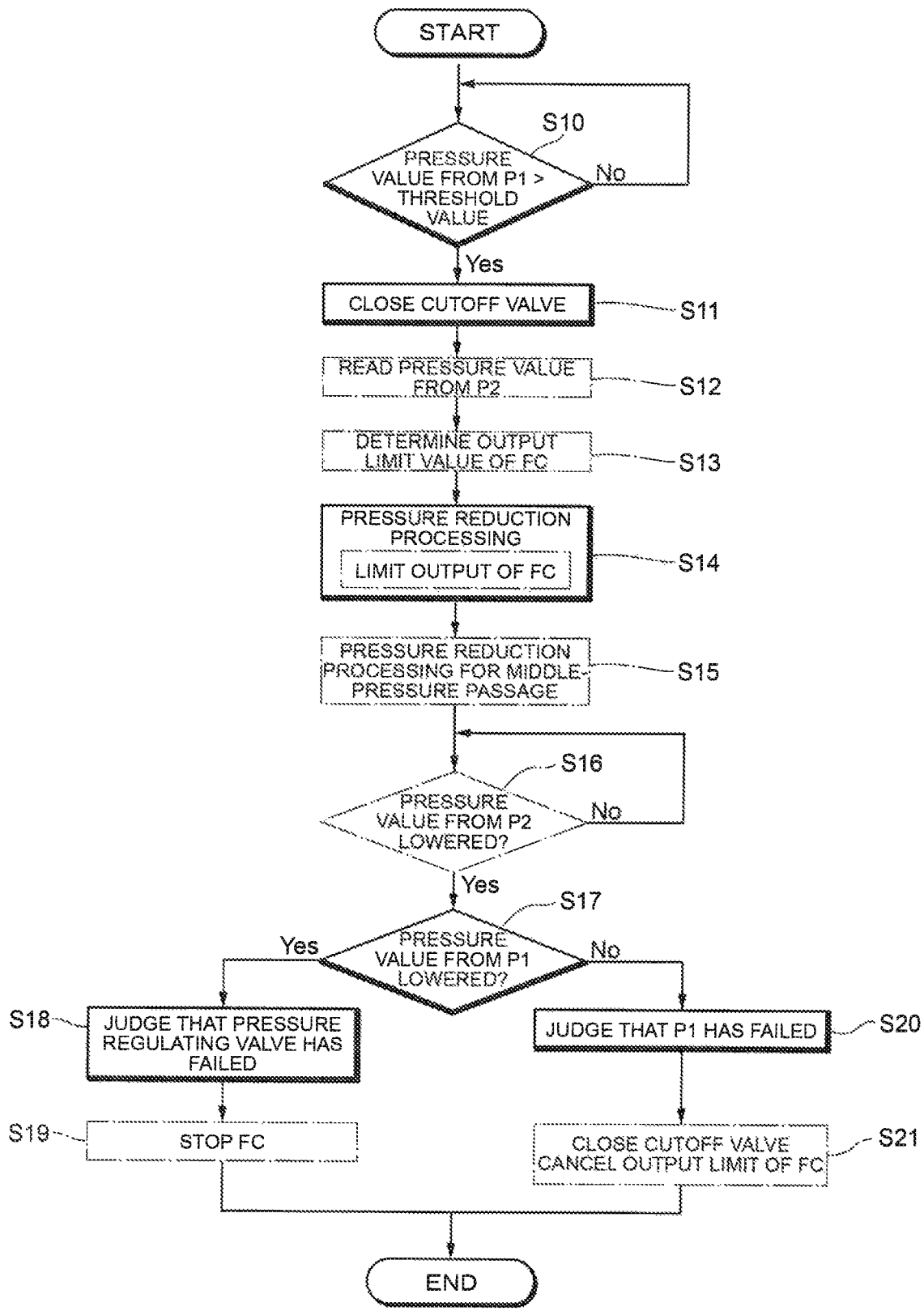

FUEL CELL SYSTEM AND CONTROL METHOD THEREFOR

CROSS-REFERENCES TO RELATED APPLICATIONS

This application relates to and claims priority from Japanese Patent Application No. JP2017-49591, filed on Mar. 15, 2017, the entire disclosure of which is incorporated herein by reference.

BACKGROUND

Field

The present invention relates to a fuel cell system in which a cutoff valve, a pressure regulating valve and a pressure sensor are arranged in a fuel gas supply passage extending from a fuel gas supply source to a fuel cell.

Description of Related Art

JP2010-021127 A discloses a fuel cell system in which high-pressure hydrogen from a hydrogen tank is subjected to a pressure reduction using a pressure regulating valve and then supplied to a fuel cell. The supply pressure of the hydrogen supplied to the fuel cell is detected by a hydrogen pressure sensor arranged downstream from the pressure regulating valve. The hydrogen pressure sensor is driven by receiving a voltage from a constant-voltage regulator. In such fuel cell system, the output of the fuel cell is stopped when the constant-voltage regulator fails.

JP2010-021127 A does not concern a situation in which a pressure value detected by the hydrogen pressure sensor becomes higher than a preset secondary-side pressure of the pressure regulating valve and still leaves room for improvement.

SUMMARY

An object of the present invention is to provide a fuel cell system that is suitable for performing appropriate failsafe when a pressure sensor downstream from a pressure regulating valve detects an abnormal pressure value, as well as a control method for such fuel cell system.

One embodiment provides a fuel cell system including: a fuel cell; a pressure regulating valve that reduces a pressure of a fuel gas; a fuel gas supply passage having a first passage extending between the fuel cell and the pressure regulating valve and a second passage extending from the pressure regulating valve via a cutoff valve to a fuel gas supply source; a first pressure sensor that detects a pressure of the fuel gas inside the first passage; and a controller to which the cutoff valve and the first pressure sensor are connected. When a pressure value detected by the first pressure sensor is an abnormal value, the controller closes the cutoff valve and performs pressure reduction processing for the first passage. Thereafter, when the pressure value detected by the first pressure sensor has lowered, the controller judges that the pressure regulating valve has failed, whereas when the pressure value detected by the first pressure sensor has not lowered, the controller judges that the first pressure sensor has failed.

One embodiment provides a control method for a fuel cell system. The fuel system includes a fuel cell; a pressure regulating valve that reduces a pressure of a fuel gas; a fuel gas supply passage having a first passage extending between the fuel cell and the pressure regulating valve and a second passage extending from the pressure regulating valve via a cutoff valve to a fuel gas supply source; a first pressure sensor that detects a pressure of the fuel gas inside the first passage; and a controller to which the cutoff valve and the first pressure sensor are connected. The method includes the steps of: judging, by the controller, that a first pressure value detected by the first pressure sensor is an abnormal value; closing, by the controller, the cutoff valve and, performing pressure reduction processing for the first passage; and judging, by the controller, that the pressure regulating valve has failed when a second pressure value detected by the first pressure sensor is smaller than the first pressure value, whereas judging, by the controller, that the pressure sensor has failed when the second pressure value is not smaller than the first pressure value.

According to such embodiments, when the first pressure sensor provided downstream from the pressure regulating valve detects an abnormal pressure value, the cutoff valve is closed. As a result, the supply of the fuel gas from the fuel gas supply source to the fuel cell stops. After the cutoff valve is closed and the pressure reduction processing for the first passage is performed, the pressure of the fuel gas inside the first passage is detected by the first pressure sensor. Since the pressure reduction processing for the first passage is performed, the pressure of the fuel gas inside the first passage should be lowered. Thus, when the pressure value detected by the first pressure sensor is not lowered, the first pressure sensor is judged to have been failed, whereas, when the pressure value detected by the first pressure sensor is lowered, the pressure regulating valve is judged to have been failed. In this way, when the above-mentioned abnormal condition occurs, an identification is made as to which of the first pressure sensor or the pressure regulating valve has failed and it is therefore possible to perform failsafe control suitable for a failed part.

The pressure reduction processing may be processing for limiting an output of the fuel cell to a lower level than in a normal condition.

With such an aspect, the pressure reduction processing for the first passage can be performed by use of electric power generated by the fuel cell.

The controller may cancel the output limit of the fuel cell when the controller judges that the first pressure sensor has failed.

Alternatively, the controller may maintain power generation of the fuel cell when the controller judges that the first pressure sensor has failed.

With those aspects, it is possible to suppress an immediate or inadvertent stop of the power generation of the fuel cell when the above-mentioned abnormal condition occurs.

The controller may stop power generation of the fuel cell when the controller judges that the pressure regulating valve has failed.

The fuel cell system may further include a second pressure sensor that detects a pressure of the fuel gas inside the second passage. After closing the cutoff valve, the controller determines an output limit value of the fuel cell based on a pressure value detected by the second pressure sensor and limits the output of the fuel cell based on the determined output limit value.

With such an aspect, it is possible to obtain the amount of fuel gas remaining in the second passage between the cutoff valve and the pressure regulating valve based on the pressure value detected by the second pressure sensor. Hence, the power generation of the fuel cell can be maintained with an output limit value according to the amount of the remaining fuel gas.

The controller may compare pressure values detected by the second pressure sensor before and after limiting the output of the fuel cell and judge, after confirming the pressure reduction inside the second passage based on a result of the comparison, whether or not the pressure value detected by the first pressure sensor has lowered.

If the pressure regulating valve is a mechanical valve, the fuel gas remaining in the second passage between the cutoff valve and the pressure regulating valve flows through the pressure regulating valve to the first passage and the pressure of the second passage and the pressure of the first passage become equal to each other. In the above-mentioned aspect, since a judgment on which of the first pressure sensor or the pressure regulating valve has failed is made after such flow of the remaining fuel gas is observed, a more reliable judgment can be made.

Another embodiment provides a fuel cell system that may further include a second pressure sensor which detects a pressure of the fuel gas inside the second passage, wherein the controller monitors, after closing the cutoff valve, a pressure reduction inside the second passage by using the second pressure sensor and judges, after confirming the pressure reduction inside the second passage based on a result of the monitoring, whether or not the pressure value detected by the first pressure sensor has lowered.

The controller may judge that the pressure value detected by the first pressure sensor is an abnormal value when the detected pressure value exceeds a threshold value.

With such an aspect, it is possible to easily judge whether or not the pressure value detected by the first pressure sensor is an abnormal value.

In some embodiments, the fuel cell system may further include an injector provided between the fuel cell and the pressure regulating valve, the injector being capable of reducing a pressure of the fuel gas. The first passage may have a third passage extending from the fuel cell to the injector and a fourth passage extending from the injector to the pressure regulating valve, and the first pressure sensor may detect a pressure of the fuel gas inside the fourth passage.

In this case, the controller may control the injector, after closing the cutoff valve and before judging whether or not the pressure value detected by the first pressure sensor has lowered, so as to guide the fuel gas inside the fourth passage into the third passage.

With such an aspect, the pressure inside the fourth passage is reduced after the cutoff valve is closed under control of the injector. After that, the pressure of the fuel gas inside the fourth passage is detected by the first pressure sensor and a judgment on which of the first pressure sensor and the pressure regulating valve has failed is made based on whether or not the pressure value has lowered, as described above.

BRIEF DESCRIPTION OF DRAWINGS

FIG. 2 is a flowchart showing a control method for the fuel cell system of FIG. 1.

DETAILED DESCRIPTION

Figure 1:
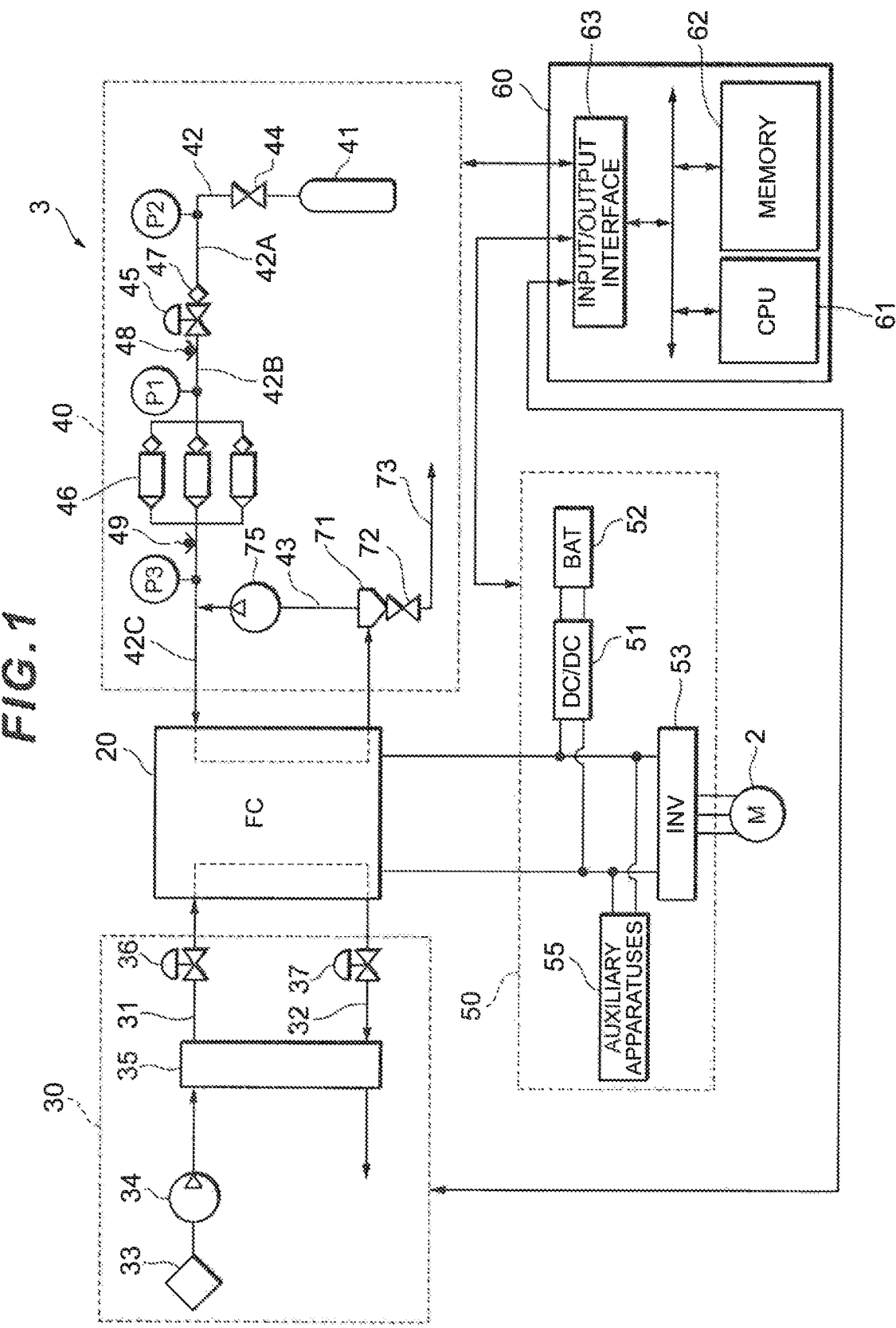
FIG. 1 is a block diagram showing a configuration of a fuel cell system according to an embodiment.

Preferred embodiments of the present invention will be described below with reference to the attached drawings.

As shown in FIG. 1, a fuel cell vehicle 1 includes a traction motor 2 and a fuel cell system 3. The traction motor 2 may be, for example, a three-phase AC motor functioning as a power source for the fuel cell vehicle 1. The fuel cell system 3 may include a fuel cell 20 which generates electric power through electrochemical reaction between hydrogen gas and oxidant gas, an oxidant gas supply system 30 which supplies air as the oxidant gas to a cathode electrode of the fuel cell 20, a fuel gas supply system 40 which supplies hydrogen as the fuel gas to an anode electrode of the fuel cell 20, a power system 50 which controls charge and discharge of electric power, and a controller 60 which collectively controls the entire system. The fuel cell 20 may be a solid polyelectrolyte-type fuel cell stack formed by stacking a plurality of cells, for example, in series, and the fuel cell 20 functions as an in-vehicle power supply.

The oxidant gas supply system 30 has an oxidant gas passage 31 through which oxidant gas to be supplied to the fuel cell 20 flows, and an oxidant off-gas passage 32 through which oxidant off-gas to be discharged from the fuel cell 20 flows. The oxidant gas passage 31 is provided with an air compressor 34 that introduces oxidant gas from the atmosphere via a filter 33, a humidifier 35 that humidifies the oxidant gas, and a throttle valve 36 that regulates the amount of the oxidant gas to be supplied. The oxidant off-gas passage 32 is provided with a back pressure regulating valve 37 for regulating the supply pressure of the oxidant gas. The humidifier 35 humidifies the oxidant gas by moisture exchange between the oxidant gas (dry gas) and the oxidant off-gas (wet gas). The humidifier 35 may be omitted.

The fuel gas supply system 40 has a fuel gas supply source 41, a fuel gas supply passage 42 through which fuel gas to be supplied from the fuel gas supply source 41 to the fuel cell 20 flows, and a circulation passage 43 for allowing the fuel off-gas discharged from the fuel cell 20 to return to the fuel gas supply passage 42. The fuel gas supply source 41 stores hydrogen at a high pressure (e.g., 35 MPa to 70 MPa). The fuel gas supply source 41 is constituted by, for example, a hydrogen tank, a hydrogen absorbing alloy, or the like. The fuel gas supply source 41 may alternatively include a reformer that generates a hydrogen-rich reformed gas from a hydrocarbon-based fuel, and a high-pressure gas tank that accumulates the reformed gas which has been generated in the reformer after bringing it into a high-pressure state.

The fuel gas supply passage 42 is provided with a cutoff valve 44, a pressure regulating valve 45 and an injector 46. The cutoff valve 44 allows or stops the supply of the fuel gas from the fuel gas supply source 41 through the fuel gas supply passage 42 to the fuel cell 20. The cutoff valve 44 functions as a main valve for the fuel gas supply source 41. The pressure regulating valve 45 is a pressure reducing valve that reduces a pressure at the upstream side of the pressure regulating valve 45 (primary pressure) to a preset secondary pressure. Although the pressure regulating valve 45 may employ any mechanical, electrical and electromagnetic configuration, a mechanical valve is employed in the present embodiment. For example, the mechanical pressure regulating valve 45 has a known configuration having a housing in which a back pressure chamber and a pressure regulating chamber are formed with a diaphragm partitioning such chambers, in which the primary pressure is reduced to a predetermined secondary pressure within the pressure regulating chamber by using a back pressure in the back pressure chamber. The pressure regulating valve 45 is assembled with a filter 47 arranged upstream therefrom and a pressure relief valve 48 arranged downstream therefrom.

The pressure relief valve 48 is normally closed and mechanically actuated when the pressure of a pipe between the pressure regulating valve 45 and the injector 46 becomes a predetermined level or higher so as to discharge the fuel gas out of the fuel gas supply passage 42.

The injector 46 is an on-off valve capable of regulating a supply pressure and a supply rate of the fuel gas to be supplied to the fuel cell 20 with a high degree of accuracy. The injector 46 may be of, for example, an electromagnetically-driven type. The injector 46 has: a valve seat having an injection hole for injecting the fuel gas; and a valve body that is driven by a solenoid so as to open and close the injection hole. The injector 46 performs the above-mentioned regulation by driving the valve body apart from the valve seat at predetermined driving intervals using an electromagnetic driving force. More than one such injector 46 may be provided in the fuel gas supply passage 42 and, in this embodiment, three injectors are provided in parallel. Each injector 46 is provided with a filter on the upstream side therefrom and a pressure relief valve 49 on the downstream side therefrom. The pressure relief valve 49 is normally closed and mechanically actuated when the pressure of a pipe between the injector 46 and the fuel cell 20 becomes a predetermined level or higher so as to discharge the fuel gas out of the fuel gas supply passage 42.

The pressure of the fuel gas supplied from the fuel gas supply source 41 to the fuel cell 20 is reduced by the pressure regulating valve 45 and the injector 46. For example, the pressure of the fuel gas sent out from the fuel gas supply source 41, which is 35 MPa-70 MPa, is reduced to about 1.5 MPa by the pressure regulating valve 45 and further reduced to about 200 kPa by the injector 46. In terms of the magnitude of the pressure of the fuel gas in each step of such two-step pressure reduction, the fuel gas supply passage 42 can be divided into the following passages: a high-pressure passage 42A extending from the fuel gas supply source 41 via the cutoff valve 44 to the pressure regulating valve 45; a middle-pressure passage 42B extending from the pressure regulating valve 45 to the injector 46; and a low-pressure passage 42C extending from the injector 46 to the fuel cell 20. The high-pressure passage 42A, the middle-pressure passage 42B and the low-pressure passage 42C are provided with a high-pressure pressure sensor P2, a middle-pressure pressure sensor P1 and a low-pressure pressure sensor P3, respectively, for detecting the pressure of the fuel gas within the respective passages. The cutoff valve 44, the injector 46, and the pressure sensors P1, P2 and P3 are connected to the controller 60. It should be noted that the pressure detected by the high-pressure pressure sensor P2 while the cutoff valve 44 is opened reflects the pressure of the fuel gas within the fuel gas supply source 41.

The middle-pressure passage 42B corresponds to a "first passage" or a "fourth passage" in the claims to be set forth later. In the same way, the high-pressure passage 42A corresponds to a "second passage," the low-pressure passage 42C corresponds to a "third passage," the middle-pressure pressure sensor P1 corresponds to a "first pressure sensor" and the high-pressure pressure sensor P2 corresponds to a "second pressure sensor."

The circulation passage 43 is connected to an exhaust/drain passage 73 via a gas-liquid separator 71 and an exhaust/drain valve 72. The gas-liquid separator 71 collects water from the fuel off-gas. The exhaust/drain valve 72 is actuated by a command from the controller 60 so as to discharge (i.e., purge) the water collected by the gas-liquid separator 71 and the fuel off-gas containing impurities inside the circulation passage 43 to the outside. The circulation passage 43 is provided with a pump 75 for compressing the fuel off-gas inside the circulation passage 43 and then delivering the compressed fuel off-gas to the low-pressure passage 42C. The low-pressure pressure sensor P3 is provided on the injector side with respect to the merging point between the circulation passage 43 and the low-pressure passage 42C. It should be noted that the fuel off-gas discharged through the exhaust/drain valve 72 and the exhaust/drain passage 73 is diluted by, for example, a diluter (not shown) and then merges with the oxidant-off gas inside the oxidant-off gas passage 32.

The power system 50 includes a DC/DC converter 51, a secondary battery 52, a traction inverter 53 and auxiliary apparatuses 55. The DC/DC converter 51 has: a function of increasing a direct-current voltage supplied from the secondary battery 52 and outputting the resulting voltage to the traction inverter 53; and a function of decreasing the voltage of direct-current power generated by the fuel cell 20 or the voltage of regenerative power collected by the traction motor 2 as a result of regenerative braking, in order to charge the secondary battery 52 with the resulting power. The charge and discharge of the secondary battery 52 are controlled with the aid of these functions of the DC/DC converter 51. In addition, the voltage conversion control by the DC/DC converter 51 controls an operating point of the fuel cell 20 (an output voltage, an output current). The secondary battery 52 functions as: a storage source for excess electric power; a storage source for regenerative energy during regenerative braking; or an energy buffer provided for a load change resulting from acceleration or deceleration of the fuel cell vehicle 1. Suitable examples of the secondary battery 52 may include a secondary battery, such as a nickel-cadmium battery, a nickel-hydrogen battery and a lithium secondary battery. The traction inverter 53 may be, for example, a PWM inverter driven by pulse width modulation, and the traction inverter 53 converts a direct-current voltage output from the fuel cell 20 or the secondary battery 52 to a three-phase alternating current voltage in accordance with a control command from the controller 60 and controls a rotation torque of the traction motor 2. The auxiliary apparatuses 55 collectively refer to various types of motors provided in respective parts of the fuel cell vehicle 1 (e.g., power sources for the pumps), inverters for driving such motors, and various types of in-vehicle auxiliary apparatuses (e.g., air compressor, injector, cooling-water circulation pump, radiator, etc.).

The controller 60 is an electronic control unit which includes a CPU 61, a memory 62, and an input/output interface 63, and the controller 60 may be, for example, constituted as a microcomputer. The CPU 61 performs a desired operation in accordance with a control program and performs various types of processing and control. The memory 62 has, for example, ROM and RAM. The ROM stores control programs and control data processed by the CPU 61 and the RAM is used as various types of work areas, mainly for the control processing. The input/output interface 63 is connected to devices constituting parts of the fuel cell vehicle 1, such as the air compressor 34, the pressure sensors P1-P3, the cutoff valve 44, the injector 46, the DC/DC converter 51, the traction inverter 53, the exhaust/drain valve 72, and the pump 75. With such configuration, the controller 60, upon receiving an input signal from various types of sensors, such as the pressure sensors P1-P3, sends a command signal to various types of loads to thereby control the entire system of the fuel cell vehicle 1. For example, the controller 60 controls the DC/DC converter 51 so as to regulate the output voltage of the fuel cell 20 to thereby control the operating point (an output voltage, an output current) of the fuel cell 20. The controller 60 determines which of the pressure sensor P1 or the pressure regulating valve 45 has failed when the pressure sensor P1 detects an abnormal value.

The following description will describe processing performed when the pressure sensor P1 detects an abnormal value with reference to FIG. 2. This processing is performed by the controller 60.

During a normal operation of the fuel cell system 3, the pressure of the fuel gas supplied from the fuel gas supply source 41 to the fuel cell 20 is monitored by the pressure sensors P1-P3. During this time, the pressure sensor P2 detects a pressure inside the fuel gas supply source 41 (e.g., 35 MPa-70 MPa), the pressure sensor P1 detects a pressure which has been reduced by the pressure regulating valve 45 to, for example, about 1.5 MPa, and the pressure sensor P3 detects a pressure which has been reduced by the injector 46 to, for example, about 200 kPa. In this context, the pressure sensors P2, P1 and P3 are defined as being in a normal condition as long as they indicate pressure values within, for example, the following ranges.

Pressure sensor P2: 1-70 MPa
Pressure sensor P1: 1.2-1.6 MPa
Pressure sensor P3: 0-300 kPa Under such conditions, predetermined pressures at which the pressure relief valves 48, 49 are mechanically activated (relief pressures) are set to the following values.

Pressure relief valve 48: 2 MPa
Pressure relief valve 49: 350 kPa

The controller 60 judges, based on a pressure value detected by the pressure sensor P1 (step S10), whether or not an abnormal pressure has occurred in the middle-pressure passage 42B. More specifically, if the pressure value detected by the pressure sensor P1 exceeds a threshold value, the controller 60 judges that this pressure value is an abnormal value (step S10: Yes). Here, the threshold value is set higher than a preset secondary side pressure of the pressure regulating valve 45 (e.g., 1.5 MPa mentioned above). For example, the threshold value may be set to 2 MPa, which is higher than an upper limit (1.6 MPa) of the above-mentioned range which has been set so as to indicate that the pressure regulating valve 45 is in a normal condition. The threshold value may alternatively be set so as to be equal to the relief pressure of the pressure relief valve 48. Next, the controller 60 closes the cutoff valve 44 (step 311). As a result, the fuel gas supply from the fuel gas supply source 41 to the fuel gas supply passage 42 is stopped. The controller 60 may cause an alarm lamp of the fuel cell vehicle 1 to light up, along with closing of the cutoff valve 44.

Next, the controller 60 obtains a pressure value detected by the pressure sensor P2 (step S12). The controller 60 then determines an output limit value of the fuel cell 20 based on the obtained pressure value (step S13). Specifically, the controller 60 calculates the amount of the fuel gas remaining in the high-pressure passage 42A between the cutoff valve 44 and the pressure regulating valve 45 based on the pressure value detected by the pressure sensor P2 and determines the output limit value of the fuel cell 20 based on the calculated value of the remaining amount. When the pressure value from the pressure sensor P2 is high, the above-mentioned remaining amount is larger than in the situation where such pressure value is low. Accordingly, if the pressure value from the pressure sensor P2 is high, the output limit of the fuel cell 20 is lowered in comparison with the situation where such pressure value is low. This is because, in a situation where the pressure value from the pressure sensor P2 is high, it is necessary to promptly reduce the pressures in the high-pressure passage 42A and in the middle-pressure passage 42B. On the other hand, in a situation where the pressure value from the pressure sensor P2 is low, since rapid exhaustion of the fuel gas causes insufficient output, the output limit of the fuel cell 20 is increased. After determining the output limit value of the fuel cell 20, the controller 60 performs pressure reduction processing for the middle-pressure passage 42B (step S14). Although this pressure reduction processing is processing for causing the fuel cell 20 to generate electric power, such processing in this context refers to processing for limiting the output of the fuel cell 20 to a lower level than usual. More specifically, the controller 60 performs the pressure reduction processing for the middle-pressure passage 42B by limiting the output of the fuel cell 20 based on the output limit value determined in the above step under the control of the DC/DC converter 51 (step S14).

The controller 60 then controls the injector 46 so as to perform processing for further reducing the pressure inside the middle-pressure passage 42B (step S15). For example, the controller 60 opens one or more injectors 46 or controls so as to open such injector(s) 46 in order to deliver the fuel gas inside the middle-pressure passage 42B into the low-pressure passage 42C. As a result, the fuel gas inside the middle-pressure passage 42B is guided into the lower pressure passage 42C and the pressure inside the middle-pressure passage 42B is reduced. When such pressure reduction occurs, the fuel gas remaining in the high-pressure passage 42A between the cutoff valve 44 and the pressure regulating valve 45 is induced to flow toward the middle-pressure passage 42B through the mechanical pressure regulating valve 45 and such flow of the fuel gas is further induced by continuing the power generation of the fuel cell 20.

After performing the pressure reduction processing for the middle-pressure passage, the controller 60 monitors pressure reduction inside the high-pressure passage 42A using the pressure sensor P2 (step S16) and, after confirming that the pressure reduction has occurred (step S16: Yes), the controller 60 checks whether or not the pressure value detected by the pressure sensor P1 has lowered (step S17). This is because, it cannot be judged with high accuracy as to whether or not the pressure inside the middle-pressure passage 42B has been reduced (whether or not the pressure value from the pressure sensor P1 has lowered) until the controller 60 confirms that the pressure reduction in the high-pressure passage 42A has occurred, i.e., after it confirms that the fuel gas remaining inside the high-pressure passage 42A has flown into the middle-pressure passage 42B through the mechanical pressure regulating valve 45 and the pressure inside the high-pressure passage 42A has thus been reduced to the same level as the pressure inside the middle-pressure passage 42B. In this context, the state wherein the pressure value detected by the pressure sensor P1 has lowered means that the pressure value (a second pressure value) from the pressure sensor P1 after closing the cutoff valve 44 becomes smaller than the pressure value from the pressure sensor P1 before closing the cutoff valve 44 (i.e., the pressure value exceeding the above-mentioned threshold value; a first pressure value).

When the pressure value detected by the pressure sensor P1 has lowered (step S17: Yes), the controller 60 judges that the pressure regulating valve 45 has failed (in an abnormal condition) (step S18). In this case, the controller 60 stops the power generation of the fuel cell 20 (step S19). At this time, the controller 60 may prompt an occupant of the fuel cell vehicle 1 to check and/or replace the pressure regulating valve 45 by displaying, for example, an alarm light.

On the other hand, when the pressure value detected by the pressure sensor P1 has not lowered (step S17: No), the controller 60 judges that the pressure sensor P1 has failed (in an abnormal condition) (step S20). In this case, the controller 60 cancels the output limit of the fuel cell 20 by opening the cutoff valve 44 (step S21). At this time, the controller 60 may prompt an occupant of the fuel cell vehicle 1 to check and/or replace the pressure sensor P1 by, for example, displaying an alarm light.

In the fuel cell system 3 according to the embodiment described above, when judging that an abnormal pressure value has been detected by the pressure sensor P1, the controller 60 first closes the cutoff valve 44 and performs the pressure reduction processing for the middle-pressure passage 42B. Then, when the pressure value detected by the pressure sensor P1 has lowered, the controller 60 judges that the pressure regulating valve 45 has failed, whereas, when the pressure value detected by the pressure sensor P1 has not lowered, the controller 60 judges that the pressure sensor P1 has failed. Since the controller 60 determines which of the pressure sensor P1 or the pressure regulating valve 45 has failed, it is possible to perform failsafe control suitable for the failed part when the pressure sensor P1 detects an abnormal pressure value.

The power generation of the fuel cell 20 is configured to be maintained under an output limit during the judgment on which of the pressure sensor P1 or the pressure regulating valve 45 has failed. Thus, it is possible to suppress an immediate or inadvertent stop of the fuel cell only on the ground of an abnormal pressure value detected by the pressure sensor P1 and it is possible to suppress sudden output reduction of the fuel cell system 3 as a whole. In addition, since the output of the fuel cell 20 is changed based on the judgment result, appropriate failsafe control can be performed. Specifically, when the pressure regulating valve 45 has failed due to, for example, clogging of foreign matters, pressure regulation by the pressure regulating valve 45 is not performed normally and the fuel gas may be discharged to the outside through the pressure relief valve 48. Thus, when judging that the pressure regulating valve 45 has failed, the controller 60 stops power generation of the fuel cell 20 (steps S18 and S19). On the other hand, when the pressure sensor P1 has failed due to, for example, drift, the pressure regulation by the pressure regulating valve 45 is performed normally and therefore the fuel cell system 3 is in a condition in which it can normally supply the fuel gas to the fuel cell 20. Therefore, when judging that the pressure sensor P1 has failed, the controller 60 opens the cutoff valve 44 to cancel the output limit of the fuel cell 20 and allows the fuel cell 20 to generate electric power as usual (steps S20 and S21). With such configuration, the fuel cell vehicle 1 can continue to travel and can therefore travel to a maintenance factory on its own.

The controller 60 determines the output limit value of the fuel cell 20 based on the pressure value detected by the pressure sensor P2 after the cutoff valve 44 is closed and limits the output of the fuel cell 20 based on the determined output limit value (steps S12-S14). With such configuration, the power generation of the fuel cell 20 can be maintained using the output limit value suitable for the amount of fuel gas remaining between the cutoff valve 44 and the pressure regulating valve 45.

The embodiment described above is provided to aid in the easy understanding of the present invention and is not intended to limit the interpretation of the present invention. The elements included in the embodiment, as well as the arrangements, materials, conditions, shapes and sizes thereof, are not limited to those illustrated in the embodiment and may be changed as appropriate. For example, the injector 46 may be omitted. Alternatively, another pressure reducing device (e.g., a pressure regulating valve) may be provided in place of the injector 46. In some embodiments, one or more steps (steps S12 and S13, a part of step S14, and steps S15, S16, S19 and S21) shown in the broken line frames in FIG. 2 may be omitted as appropriate. As one example, steps S12 and S13 in FIG. 2 may be omitted and the output of the fuel cell 20 may not be limited in the pressure reduction processing in step S14. In this case, the pressure reduction processing may be performed by maintaining the normal power generation (normal operation) of the fuel cell 20. In such case, the cutoff valve 44 may be opened and the normal power generation (normal operation) of the fuel cell 20 may be maintained in step S21.

What is claimed is:

1. A fuel cell system, comprising:
 a fuel cell;
 a pressure regulating valve that reduces a pressure of a fuel gas;
 a fuel gas supply passage having a first passage extending between the fuel cell and the pressure regulating valve and a second passage extending from the pressure regulating valve via a cutoff valve to a fuel gas supply source;
 a first pressure sensor that detects a pressure of the fuel gas inside the first passage; and
 a controller to which the cutoff valve and the first pressure sensor are connected,
 wherein the controller is programmed to:
 when a pressure value detected by the first pressure sensor is an abnormal value, close the cutoff valve and perform pressure reduction processing for the first passage; and
 thereafter, judge that the pressure regulating valve has failed when the pressure value detected by the first pressure sensor has lowered, or judge that the first pressure sensor has failed when the pressure value detected by the first pressure sensor has not lowered.

2. The fuel cell system according to claim 1, wherein the pressure reduction processing is processing for limiting an output of the fuel cell to a lower level than in a normal condition.

3. The fuel cell system according to claim 2, wherein when the controller judges that the first pressure sensor has failed, the controller is programmed to cancel the output limit of the fuel cell.

4. The fuel cell system according to claim 1, wherein when the controller judges that the first pressure sensor has failed, the controller is programmed to maintain power generation of the fuel cell.

5. The fuel cell system according to claim 1, wherein when the controller judges that the pressure regulating valve has failed, the controller is programmed to stop power generation of the fuel cell.

6. The fuel cell system according to claim 2, further comprising a second pressure sensor that detects a pressure of the fuel gas inside the second passage,
 wherein, after closing the cutoff valve, the controller is programmed to determine an output limit value of the fuel cell based on a pressure value detected by the second pressure sensor and limit the output of the fuel cell based on the determined output limit value.

7. The fuel cell system according to claim 6, wherein the controller is programmed to compare pressure values detected by the second pressure sensor before and after limiting the output of the fuel cell and judge, after confirming the pressure reduction inside the second passage based on a result of the comparison, whether or not the pressure value detected by the first pressure sensor has lowered.

8. The fuel cell system according to claim 1, further comprising a second pressure sensor which detects a pressure of the fuel gas inside the second passage,
wherein, after closing the cutoff valve, the controller is programmed to monitor a pressure reduction inside the second passage by using the second pressure sensor and judge, after confirming the pressure reduction inside the second passage based on a result of the monitoring, whether or not the pressure value detected by the first pressure sensor has lowered.

9. The fuel cell system according to claim 1, wherein when the detected pressure value exceeds a threshold value, the controller is programmed to judge that the pressure value detected by the first pressure sensor is an abnormal value.

10. The fuel cell system according to claim 1, further comprising an injector provided between the fuel cell and the pressure regulating valve, the injector being capable of reducing a pressure of the fuel gas,
wherein the first passage has a third passage extending from the fuel cell to the injector and a fourth passage extending from the injector to the pressure regulating valve; and
the first pressure sensor detects a pressure of the fuel gas inside the fourth passage.

11. The fuel cell system according to claim 10, wherein the controller is programmed to control the injector, after closing the cutoff valve and before judging whether or not the pressure value detected by the first pressure sensor has lowered, so as to guide the fuel gas inside the fourth passage into the third passage.

12. A control method for a fuel cell system, the fuel cell system comprising: a fuel cell; a pressure regulating valve that reduces a pressure of a fuel gas; a fuel gas supply passage having a first passage extending between the fuel cell and the pressure regulating valve and a second passage extending from the pressure regulating valve via a cutoff valve to a fuel gas supply source; a first pressure sensor that detects a pressure of the fuel gas inside the first passage; and a controller to which the cutoff valve and the first pressure sensor are connected, the method comprising:
judging, by the controller, that a first pressure value detected by the first pressure sensor is an abnormal value;
closing, by the controller, the cutoff valve and performing pressure reduction processing for the first passage; and
judging, by the controller, that the pressure regulating valve has failed when a second pressure value detected by the first pressure sensor is smaller than the first pressure value, whereas judging, by the controller, that the pressure sensor has failed when the second pressure value is not smaller than the first pressure value.

* * * * *